US008612938B2

(12) United States Patent
Prasad et al.

(10) Patent No.: US 8,612,938 B2
(45) Date of Patent: Dec. 17, 2013

(54) SYSTEM AND METHOD FOR AUTOMATIC GENERATION OF TEST DATA TO SATISFY MODIFIED CONDITION DECISION COVERAGE

(75) Inventors: Bokil Prasad, Pune (IN); Darke Priyanka, Pune (IN); Venkatesh Ramanathan, Pune (IN); Shrotri Ulka, Pune (IN)

(73) Assignee: TATA Consultancy Services Limited, Maharashtra (IN)

( * ) Notice: Subject to any disclaimer, the term of this patent is extended or adjusted under 35 U.S.C. 154(b) by 981 days.

(21) Appl. No.: 12/652,297

(22) Filed: Jan. 5, 2010

(65) Prior Publication Data

US 2010/0175052 A1 Jul. 8, 2010

(30) Foreign Application Priority Data

Jan. 5, 2009 (IN) .............................. 26/MUM/2009

(51) Int. Cl.
*G06F 9/44* (2006.01)
(52) U.S. Cl.
USPC ........... 717/128; 717/124; 717/126; 717/127; 717/151; 717/130
(58) Field of Classification Search
USPC ................................ 717/101–178; 714/1–824
See application file for complete search history.

(56) References Cited

U.S. PATENT DOCUMENTS

| | | | |
|---|---|---|---|
| 7,865,339 B2 * | 1/2011 | Rushby et al. ..................... 703/2 |
| 7,970,594 B2 * | 6/2011 | Gaudette ......................... 703/13 |
| 8,056,058 B2 * | 11/2011 | Huang et al. .................. 717/124 |
| 8,265,916 B1 * | 9/2012 | Portal et al. ..................... 703/13 |
| 8,346,526 B1 * | 1/2013 | Portal et al. ..................... 703/13 |
| 2006/0010428 A1 * | 1/2006 | Rushby et al. ................. 717/124 |
| 2007/0016394 A1 | 1/2007 | Gaudette |
| 2008/0109194 A1 * | 5/2008 | Gaudette ........................... 703/6 |
| 2008/0263505 A1 * | 10/2008 | StClair et al. .................. 717/101 |
| 2008/0288925 A1 * | 11/2008 | Huang et al. ................... 717/128 |

OTHER PUBLICATIONS

The Effect of Program and Model Structure on MC/DC Test Adequacy Coverage—Ajitha Rajan, Dept. of Comp. Sci. and Eng. University of Minnesota—Michael W. Whalen, Advanced Technology Center Rockwell Collins Inc—Mats P.E. Heimdahl, Dept. of Comp. Sci. and Eng. University of Minnesota—May 2008.*
Coverage Metrics for Requirements-Based Testing—Michael W. Whalen Advanced Technology Center Rockwell Collins Inc—Ajitha Rajan Dept. of Comp. Sci. and Eng. University of Minnesota—Mats P.E. Heimdahl Dept. of Comp. Sci. and Eng. University of Minnesota—Steven P. Miller Advanced Technology Center Rockwell Collins Inc.—Jul. 2006.*
Auto-generating Test Sequences Using Model Checkers: A Case Study—Mats P.E. Heimdahl, Sanjai Rayadurgam, Willem Visser, George Devaraj, and Jimin Gao—Department of Computer Science and Engineering University of Minnesota, Minneapolis—2004.*

(Continued)

*Primary Examiner* — Lewis A Bullock, Jr.
*Assistant Examiner* — Francisco Aponte
(74) *Attorney, Agent, or Firm* — Robert P. Michal; Lucas & Mercanti, LLP

(57) ABSTRACT

The tool, MC/DC-Automatic Tool Generator automatically generates test data to satisfy Modified Condition Decision Coverage (MCDC) from input code/model. This tool reduces the effort required to generate MCDC test data significantly. In order to reduce the time required by model checkers, abstraction and optimization methodologies have been implemented to analyze typical reactive software model/code.

8 Claims, 2 Drawing Sheets

(56) References Cited

OTHER PUBLICATIONS

Figure 1:
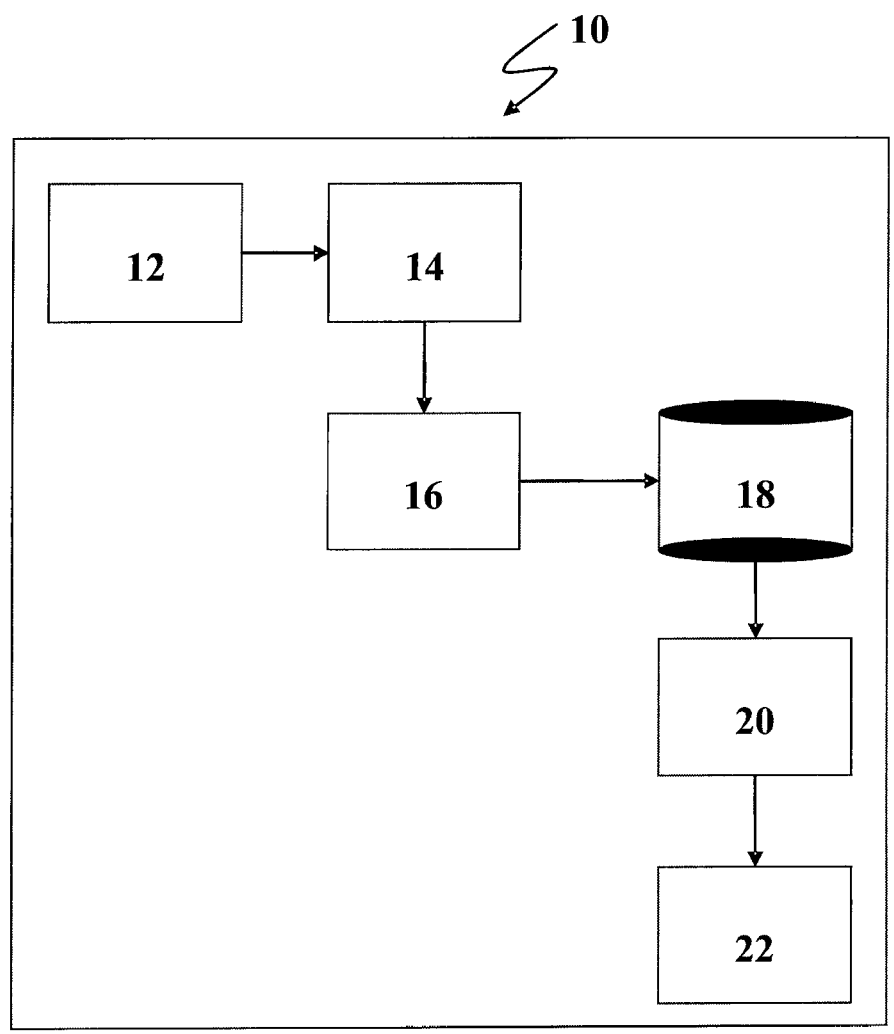

Hayhurst, Kelly J.; Veerhusen, Dan S.; Chilenski, John J.; Rierson, Leanna K., "A Practical Tutorial on Modified Condition/Decision Coverage," Technical Report: NASA-2001-tm210876, Year of Publication: 2001, NASA Langley Technical Report Server (85 pages).
Godefroid, Patrice; Klarlund, Nils; Sen, Koushik, "DART: Directed Automated Random Testing," ACM SIGPLAN Notices archive, Jun. 2005, pp. 213-223, vol. 40, Issue 6, ACM SIGPLAN 2005 Conference on Programming Language Design and Implementation, Chicago (11 pages).
Thomas Ball and Sriram K. Rajamani, "The SLAM project—Debugging system program via static analysis," Proceedings of POPL, pp. 1-3, Jan. 2002.
Dirk Beyer, Thomas A. Henzinger, Ranjit Jhala, and Rupak Majumdar, "The program model-checker BLAST," Springer-Verlag, pp. 1-20, Sep. 2007.

* cited by examiner

SYSTEM AND METHOD FOR AUTOMATIC GENERATION OF TEST DATA TO SATISFY MODIFIED CONDITION DECISION COVERAGE

CROSS-REFERENCE TO RELATED APPLICATION

The present application claims priority under 35 USC 119 of Indian Patent Application 26/MUM/2009 filed Jan. 5, 2009, the entire disclosure of which is incorporated herein by reference.

FIELD OF INVENTION

The present invention relates to the field of program testing. Particularly, the present invention relates to the field of generating test data for structural analysis.

DEFINITIONS OF TERMS USED IN THE SPECIFICATION

The expression 'MC/DC or MCDC' in this specification is used to refer to Modified Condition Decision Coverage.

The expression 'MC/DC metric compliance' in this specification is used to refer to a metric compliance requiring generation/existence of enough test data to verify that every condition in a program code affects the result of its encompassing decision.

The expression 'Metric' in this specification is used to refer to the measure of a specific property of a program code, here MC/DC.

The expression 'Reactive System' in this specification is used to refer to a real time system which is responsive towards real-time events.

The expression 'BLAST' in this specification is used to refer to the abbreviation of Berkeley Lazy Abstraction Software Verification Tool, which is a software model checking tool and checks if the program code satisfies behavioural requirement of its associated interfaces.

The expression 'SAL' in this specification is used to refer to the abbreviation of Symbolic Analysis Laboratory, which is an automated formal method for program code verification.

The expression 'Annotation' in this specification is used to refer to the additional code in a program code which is not a part of the functionality of the program code, but to encapsulate pertinent information regarding that program code, e.g. information to compiler, run time processing and the like.

The expression 'Function Based level' in this specification is used to refer to style of programming that emphasizes the evaluation of expressions rather than the execution of commands.

The expression 'Module Based level' in this specification is used to refer to a programming style that breaks down program functions into modules, each of which accomplishes one function and contains all the source code and variables needed to accomplish that function.

The expression 'Sub-system Based level' in this specification is used to refer programming of a program or set of related programs designed as a unit to perform related functions.

BACKGROUND OF THE INVENTION

Program testing is an indispensable aspect of verification and validation process in any Program Development Cycle. It is the means of verifying a program. Coverage analysis is a part of testing, which improves the quality and dependability of program. Modified Condition/Decision Coverage analysis is a compulsion for many safety critical applications and it is rendered compulsory for DO-178B for level-A program certification.

The process of developing test cases is tedious and conventionally has been manual. Developing these test cases makes the developers and the program testers identify various segments/conditions/parts of the program code being executed for a particular set of test cases/test data. This, with the help of analysis tools, identifies whether a particular safety critical condition is getting executed or not. Depending on the test analysis a new set of test cases/test data are developed with an intention of covering segments/conditions/parts of the code not covered by the previous test cases/test data.

Requirements based testing may not be sufficient to test code structure of the program, because in many cases, there isn't an exact mapping between the requirements specifications and the actual code. Because of this drawback, there is a need for structural testing of the code. Structural testing is the way of measuring the extent to which the requirements based test data covered the code structure. If the requirements based test data do not satisfy a structural coverage criterion, then additional test data has to be generated until acceptable structural coverage is achieved.

Various types of structural coverage criteria are as follows
Function coverage
Statement coverage
Decision coverage
Condition coverage
Condition/Decision coverage
Modified condition/decision coverage (MCDC)
Multiple condition coverage Referring to Kelly J. Hayhurst, Dan S. Veerhusen, John J. Chilenski and Leanna K. Rierson ["A Practical Tutorial on Modified Condition/Decision Coverage"], MC/DC analysis illustrates the independent effect of all the conditions present in a decision in a program code and subsumes all other structural coverage criteria except Multiple Condition coverage.

Code coverage is important since it significantly decreases the number of undetected bugs in the program. Thus, it improves the reliability of the program.

For complete coverage of the code, multiple condition coverage is ideal, but not practical. MCDC, therefore, provides the optimal practical alternative. Therefore, it has been rendered compulsory by DO-178B for level-A program certification.

The DO-178B definition of MC/DC includes the property that each condition is shown to affect the decision's outcome independently. This is done by varying only that condition and holding all other conditions fixed. This envisages achieving the independent effect of that condition. Independent effect is the property that sets apart MC/DC from the other coverage criteria because it guarantees a more comprehensive coverage as compared to the rest of the feasible structural coverage criteria. Therefore, MC/DC analysis is demanded by program manufacturers and standardization organizations.

The independent effect property of MC/DC influences the amount of test data to be created for a particular program. If the number of conditions present in the program is n, then the maximum test data that may have to be prepared is 2n, implying an average to a big test suite. But due to the following factors,
    size and complexity of the code;
    size and complexity of Boolean expressions in the code;

It becomes extremely difficult to prepare test data for a large, deeply nested decision which can be reached via multiple program paths;

Programmatic level of testing (unit level, functional level, module level);

the task of test suite preparation becomes more complicated and time consuming,

Preparation of test data that satisfy MC/DC for unit level testing is quite intuitive as compared to module level. Validation and modification of the prepared test data due to human errors also takes up a lot of manual time.

Automatic generation of test data for MC/DC coverage reduces the time and effort required to manually prepare the same test data. Thus, the overall time and cost of testing phase in software is reduced. This results in faster shipping of more reliable software.

P. Godefroid, N. Klarlund, and K. Sen. DART: Directed Automated Random Testing [Proceedings of PLDI'2005 (ACM SIGPLAN 2005 Conference on Programming Language Design and Implementation), pages 213-223, Chicago, June 2005] mentions automatic identification of interfaces between the program code with the working environment of the code and then applies random test values to test the code for general environment of the program. The paper also mentions the automatic generation of test cases to invoke alternative parts of the code. But, this document does not mention anything about the MC/DC analysis as the testing is random and doesn't guarantee invoking every condition in the program.

T. Ball, S. K. Rajamani The SLAM project—Debugging system program via static analysis [Proceedings of POPL'02 January] and Beyer, Henzinger, Jhala and Majumdar—The program model-checker BLAST [Springer-Verlag, September 2007] reveals Property Verification tools but doesn't mention generation of test data to verify the code.

PRIOR ART

United States Patent Application 20060010428 discloses a formal method for test case generation. The patent application reveals the iterative method of developing test cases by using a Model Checker. The test cases are developed to check the coverage of the model/source code. The method in this document extends the test region of the model by modifying the model in 2 ways, 1) by slicing and, 2) by extension. Extension means modifying the model so that the next test can extend the previous one possible. The document also mentions the usage of Symbolic Analysis Laboratory (SAL) model checking environment for symbolic, bounded, infinite bounded and witness model checking.

US Patent Application 20070016394 discloses a System and method for using model analysis to generate directed test vectors. In this document a Matlab/Simulink model is used to check the coverage of the code. A test case achieves full coverage for a Matlab/Simulink block if, for every input, there is a pair of simulation times when changing that input alone causes a change in the block's output. A test case achieves full coverage for a transition if, for each condition on the transition, there is at least one time when a change in the condition triggers the transition. The relevance of this document with regards to present invention is the fact that this document also discloses a method of using multiple test cases to achieve full model coverage. But, this document mentions no way of test data generation as well as no iterative way in which the generation and testing of test cases/test data will eventually stop once full coverage is achieved. Also, in this document a Matlab/Simulink model is used to check coverage as compared to source code in the present invention.

United States Patent Application 2008288925 discloses a method for generating test cases for program. This document mentions a method of generating test cases using reference points embedded in to the program.

Following tools are available that generate test data for structural coverage based on system models and not from code.

Reactis
Statemate ATG

Following tools report MCDC coverage attained by the test suite, given a test suit, and a piece of code or model.

Cantata++
Telelogic Rhapsody ATG
BullseyeCoverage.

CoverageMaster winAMS is a tool that generates test data for MC/DC coverage. This tool suffers from the draw back that it generates test data based on static analysis technique, which can fail to generate test data for MCDC coverage due to false positives. Hence, there is a need for a dynamic and automated approach in generation of test data for MC/DC compliance metric.

OBJECT OF THE INVENTION

One object of this invention is to propose a method to generate test data for masking MC/DC using source code.

Yet another object of this invention to propose a method to achieve reduction in time and effort required for the preparation of test data for MC/DC analysis.

Yet another object of this invention is to propose a method to generate more reliable test data for MC/DC analysis as compared to manual generation of test data for MC/DC analysis.

One more object of this invention is to propose a method to create a checker that reports whether the given code and the test data present in the code have achieved masking MC/DC for that program code.

Yet another object of this invention is to propose a method to generate test data for MC/DC such that it is not limited to the level of testing (such as, unit level, module level or sub-system level).

Yet another object of this invention is to propose a method to ensure that the model checkers being used scale up for a larger size of code.

SUMMARY OF THE INVENTION

The present invention envisages a system for automatic generation of test data for function-based, module-based and sub-system based levels of testing of a program code and satisfying the Modified Condition/Decision Coverage (MC/DC) metric, said system comprising:

a) optimization means adapted to optimize the program code;
b) annotation means adapted to insert at least two assert statements at a pre-determined location in said optimized program code and further adapted to create an annotated set of programs;
c) a database storing said set of annotated programs;
d) processing means co-operating with the database, said processing means comprising:
  i. trace generation means adapted to generate a trace for each of the annotated programs in the said set;
  ii. translation means adapted to translate each trace to a model checker specification;

iii. test data generation means adapted to generate test data for each of the translated specifications; and a) MC/DC checking means adapted to receive and test the program code with said generated test data and further adapted to provide a feedback on the MC/DC metric compliance.

The invention leads to safer machines (such as cars and aeroplanes) and devices such as medical equipment. Also, the machines can be delivered faster to the end user.

Preferably, the optimization means optimizes and abstracts the program code using techniques selected from a group of techniques consisting of constant folding technique, loop unrolling technique and delay abstractions technique.

Typically, annotation means is adapted to insert annotations at a pre-determined location selected from a group of locations consisting of pre-decision location, post-decision location and assignment location in the program code.

Preferably, trace generation means uses a model checker for generation of traces.

Typically, trace generation means further comprises an alerting means adapted to provide alerts in the event that any violation is generated during the program trace.

Preferably, test data generation means adapted to generate test data using the counterexample based approach.

In accordance with the present invention, there is provided a method for automatic generation of test data for function-based, module-based and sub-system based levels of testing of a program code and satisfying the Modified Condition/Decision Coverage (MC/DC) metric, said method comprising the following steps:

a) performing abstraction and optimisation on the original program code;
b) annotating the abstracted and optimised program code to generate a set of programs with at least two assert statements inserted into it;
c) storing the annotated set of programs in a database;
d) generating traces/counterexamples for each of the annotated program codes using a model checker;
e) checking for violation of the assert conditions inserted in the said annotated source code using a model checker which will lead to the generation of a traces;
f) generating test data for the code using a model-checker;
g) testing the program code using the MC/DC checker;
h) identifying condition not covered by the test cases using the MC/DC checker; and
i) providing a feedback on the MC/DC metric compliance, in case of non-compliance the program code is iterated for a new set of traces.

Typically, step of generating traces includes the step of generating traces using a model checker.

Preferably, step of generating test data includes the step of using a model checker to generate a counterexample.

Typically, step of testing the program code includes the step of checking whether the given input source code has achieved masking MC/DC for decisions using said generated test data.

BRIEF DESCRIPTION OF THE ACCOMPANYING DRAWINGS

Various aspects of System and Method for Automatic Generation of Test-Data to Satisfy Modified Condition Decision Coverage will become apparent by consideration of the accompanying drawings and their description stated below, which are merely illustrative of a preferred embodiment of the invention and do not limit in any way the nature and scope of the invention.

Figure 2:
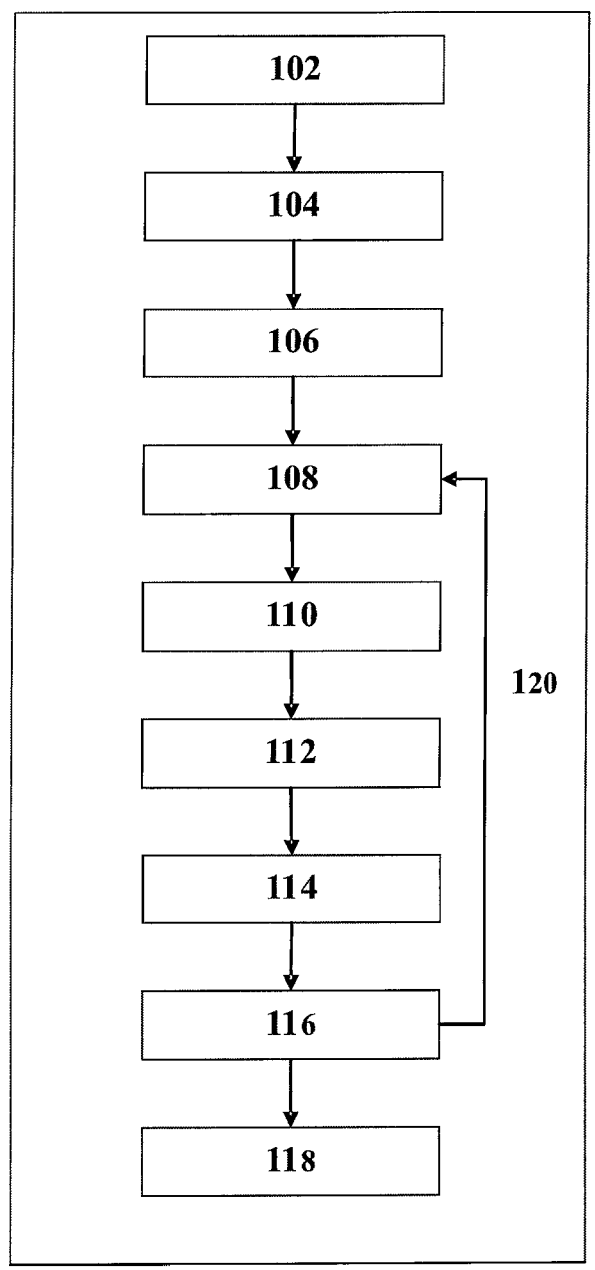

FIG. 1 illustrates the system diagram of the MC/DC Automatic Test Data Generation System in accordance with this invention; and FIG. 2 illustrates the schematic of the flowchart of the MC/DC Automatic Test Data Generation System in accordance with this invention;

DETAILED DESCRIPTION OF THE ACCOMPANYING DRAWINGS

The present invention envisages a system and a method for automatic test case generation for a given program code/model so as to satisfy the Modified Condition Decision Coverage criteria for that program code.

The system and the method in accordance with the present invention produce test data that results in verification of formation of independence pairs for all possible conditions in the program code. The system also lists out the conditions for which it could not generate any independence pairs.

In accordance to present invention, to produce MC/DC compliant test data for a program, the system performs the step of 1. Annotation of code with asserts (two per condition); and then iterates through the following main stages
2. Generation of execution paths (called traces) to cover a condition using a model checker;
3. Generation of test data to cover a condition using a model checker traces
4. Analysing for MC/DC compliance and identifying conditions not yet covered.

Each iteration starts with an arbitrary condition selected from the set of uncovered conditions. Initially, the set of uncovered conditions includes all conditions in the program and for later iterations the set of uncovered conditions is generated by stage 4. The iterations stop when all the conditions are covered or when no conditions from the uncovered set can be covered any further.

Referring to the accompanying drawings, FIG. 1 illustrates the system for automatic generation of test data for function-based, module-based and sub-system based levels of testing of a program code and satisfying the Modified Condition/Decision Coverage (MC/DC) metric 10.

In accordance to the current invention, the system comprises of the Abstraction means 12 adapted to perform a) Delay Handling Abstraction b) Loop Replacement Abstraction on the original program code. The abstracted code is forwarded to the Optimisation means 14 to perform a) Loop Unfolding Optimisation, b) Useless Assignment Exclusion Optimisation, c) Complex Expression Simplification Optimisation.

The abstracted and optimised code is forwarded to the Program Code Annotation means 16 to generate a set of annotated programs. These set of annotated programs are stored in the data base means 18 and then forwarded in sequential order to the Processing means 20. The processing means generates traces of annotated program and translates the traces into an input format compatible with a model checker, which will generate counterexamples. The processing means 20 generates test data from each of these translated traces. Eventually, the MC/DC Checker means 22 tests the program code with the generated test data and generates MC/DC compliance metric. The MC/DC checker means is further adapted to provide feedback to Database means 18 to notify the traces not yet covered and to avoid generation of redundant test data.

In accordance with the present invention, the Abstraction means 12 is adapted to perform the following, Delay Handling Abstractions:

Frequently, in reactive systems, delays are used to count time units since a relevant external event is registered and an action, like automatic locking of the car doors, is performed after specified and pre-programmed time units have passed. Delays are implemented by incrementing a variable (delay variable) at each step of the program. The range of values for such a variable and their comparisons at each step of the program affect the scalability of model checkers. For generating test data satisfying MC/DC, actual values of the counting variables in a delay program are unimportant.

In accordance to the present invention, these delay variables were abstracted out and instead two Boolean events/variables as follows were introduced delay event representing the delay variable.
   delay enabled flag representing the fact that delay of specified units of time has been achieved.

The delay event is randomly set by the environment. The code incrementing the delay variable is replaced to check for this delay event and once the delay is achieved the delay enabled flag is set. Thus, the code for incrementing the value of the delay variable at each step is removed completely and original delay comparisons becomes a mere Boolean comparison, thereby giving notable scalability. The example code is shown as follows;

| Sample Code For Implementing Delay Event | Abstracted Code |
|---|---|
| /*int dly_cntrl is initialized to zero */<br>/* at every step the following code gets executed */<br>if (dly_cntrl < DLY_MAX)<br>   dly_cntrl++;<br>/* somewhere in the code...*/<br>if (dly_cntrl == DLY_MAX)<br>{<br>   /* actions on delay event */<br>} | /*dly_cntrl is now delay event and dly_cntrl_en is the delay enabled flag */<br>if (dly_cntrl)<br>   dly_cntrl_en=true;<br>/* somewhere in the code...*/<br>if (dly_cntrl_en)<br>{<br>   /* actions on delay event */<br>} |

In accordance to the present invention, the above table illustrates the delay abstractions. The program code on the left hand side is a delay implementation from the original program code. The right hand side contains the abstracted code with delay abstractions applied to it.

1. Loop Replacement Abstractions:

During Loop Iteration, the result of the iteration can be an array element/s itself or a value derived from this/these element/s. Using Loop replacement abstraction the result is replaced by a random value from environment that will satisfy certain constraints defined by the domain requirements.

The example code is shown as follows;

| Sample Code For Loop For Calculating Average | Abstracted Code |
|---|---|
| sum = 0;<br>for ( k=0 ;k<length; k++)<br>   sum = sum + arr[k];<br>avg = sum / length; | /* length is known to be 10 */<br>avg = <constrained random value>; |

In accordance to the present invention, the above mentioned table illustrates Loop Replacement Abstraction. The left hand side contains the program loop code in the original program code. The right hand side contains the optimised program code after abstracting the loop. In accordance to the above table, the constraints on the random value would be the valid range for 'avg' i.e. average value.

In accordance to present invention, the Optimisation means 14 is adapted to perform the following, 1. Loop Unfolding Optimisation:

In accordance with the current invention, in program code consisting loop iteration not more than 20, program loops are unfolded completely. In situations consisting large loop iterations loops were unfolded partially.

The example code is shown as follows,

| Sample Code For Loop With Large Iterations | Optimized Code |
|---|---|
| for ( k=0 ;k<1096; k++)<br>   arr[k] = x; | for ( k=0 ;k<1096; k+=4)<br>{<br>   arr[k] = x;<br>   arr[k+1] = x;<br>   arr[k+2] = x;<br>   arr[k+3] = x;<br>} |

In accordance to the present invention, Loop Unfolding Optimization is illustrated in the above table. The optimization illustrated is partial in nature. The program code on the left hand side of the table is the program loop code in the original program code. The right hand side contains the optimized program code after partial unfolding of the program loop code.

2. Exclusion of Useless Assignment Optimisation:

In accordance with the present invention, assignment to a variable in program code is considered useless if that variable is not used in the later part of the program code. Thus, useless assignments were identified and removed to achieve effective optimisation.

3. Simplification of Complex Expression Optimisation:

In accordance with the present invention, complex expressions in the program code are simplified using constant folding. This assists in reducing the number of mathematical operations to be performed by model checkers and thus improving their scalability.

In accordance to the present invention, the Program Code Annotation means 16 is adapted to, given an input program and a condition, generate a program code with two assert statements inserted. The assert statements are inserted such that the meaning of the program does not change and they are inserted just before the decision that the input condition is a part of, thus generating annotated programs.

In accordance to the present invention, the Database means 18 is adapted to store the set of annotated programs generated from the Code Annotation means 16.

In accordance to present invention, the Processing means 20 comprises

Program Selector means
   Trace Generator means/Test Data Generator means

The Program Selector means is adapted to select a program to be given to a model checker.

The Trace Generator also called the Test Data Generator means is adapted to produce a trace that violates the assert statement or confirms assertion cannot be violated or the test data using the counterexample. The Trace Generator means is adapted to enter into a loop or exit confirming it has run out of resources. The abstractions and optimisations performed on the program code by the Abstraction means 12 and Optimisation means 14 reduce the number of programs from the set of annotated programs which make model checker enter into loops or confirm that it has ran out of resources.

In accordance to present invention, the MC/DC Checker means 22 is adapted to run the program code for the generated test data and adapted for verification of the program code towards MC/DC compliance metric. The MC/DC Checker means 22 is also adapted to provide feedback to the Program Selector means 16 so as to avoid generation of redundant test data.

In accordance with the present invention, there is provided automatically generating MC/DC compliant test data system, which comprises the following steps as seen in FIG. 2:

A method for automatic generation of test data for function-based, module-based and sub-system based levels of testing of a program code and satisfying the Modified Condition/Decision Coverage (MC/DC) metric, said method comprising of following steps:

a) performing abstraction and optimisation on the original program code 102;

b) annotating the abstracted and optimised program code to generate set of programs with at least two assert statements inserted into it 104;

c) storing the annotated set of programs in a database 106;

d) Selecting an annotated program for trace generation 108;

e) checking for violation of the assert condition inserted in the said annotated source code using a model checker 110;

f)

g) generating test data for a given condition using model-checker 114;

h) testing the program code using the MC/DC checker 116;

i) identifying condition not covered by the test cases using the MC/DC checker 118; and j) providing feedback 120 on the MC/DC metric compliance, in case of non-compliance the program code is iterated for a new set of traces.

In accordance to the present invention, the step of generating traces includes the step of generating traces using a model checker.

In accordance to the present invention, the step of generating test data includes the step of using a model checker.

In accordance to the present invention, the step of testing the program code includes the step of checking whether the given input source code has achieved MCDC masking for decisions using said generated test data.

Experimental Data

In accordance with one embodiment of the present invention, the following case studies are observed to envisage the objects of the current invention, Case Study 1:

The Focus of the First Case Study was Two Fold,

To demonstrate that, at function level, the tool takes lesser time and effort to generate MC/DC compliant test data, in comparison with manually preparing MC/DC compliant test data; and For module level, the tool can generate MC/DC compliant test data for which manually preparing MC/DC compliant test data is not feasible.

In accordance to the present invention, the process and method of the case study is as follows, An independent team was assigned the task of preparing function level test data for three different modules (A, B and C), which would achieve 100% MC/DC compliance for the program code. The modules had looping constructs in the program code. For function level, the team was able to prepare test data that satisfied MC/DC compliance for all decision statements.

In accordance to the present invention, the present invention was run at function level. The present invention was successful in identifying and applying all possible abstractions and optimizations to the program code. The present invention was successful in generating MC/DC compliance test data in lesser time than manually preparing the test data.

The comparison between function level testing, where 100% MC/DC coverage was achieved by manual test data preparation as well as use of the present invention is tabulated in the following table.

| Module | A | B | C |
|---|---|---|---|
| Total functions | 1 | 15 | 16 |
| Total conditions | 117 | 70 | 174 |
| Approximate manual time | 8 hrs | 24 hrs | 24 hrs |
| Time taken by present invention | 3 hrs | 3 hrs | 4 hrs |

The same team was also assigned the task to prepare MCDC satisfying test data for module level. However, the team aborted this task since it was time consuming and required too much of an effort. MCDC-ATG was run on the same modules after applying the abstractions and optimizations. The results indicated that for module level, the present invention can generate test data for which manually preparing test data is not feasible. Following table illustrates the performance of the present invention at module level.

| Module | A | B | C |
|---|---|---|---|
| Lines of code | 150 | 900 | 1600 |
| Total conditions | 117 | 70 | 174 |
| Number of conditions satisfied by the present invention. | 117 | 41 | 93 |

Upon running the present invention at the module level, as per the findings, some conditions did not achieve MC/DC compliance. This was because all the traces could not be generated. The reasons were as follows, condition was a part of dead code, hence could not be covered; program code was in a manner that generating independence pair was not feasible for those conditions; and Model checkers did not scale up.

The first two points are related to the input program code. The program code was checked for situations reported in the first two points.

Case Study 2:

The objective of the second case study was to verify that abstractions for delays actually assist in scaling up model checking.

The present invention was run on two modules of a reactive system containing an outer loop. The modules received inputs from the environment per iteration of the outer loop. The values of the inputs can change or remain the same. Delays were present in the original code of the modules. Test data was prepared without abstractions on program code for delays and also after applying abstractions. The abstractions helped generate test data to cover conditions which were not possible without them. The results of this case study have been tabulated in the table below,

| | Module | A | B |
|---|---|---|---|
| | Lines of code | 1300 | 700 |
| | Total conditions | 94 | 71 |
| Number of conditions satisfied by MCDC-ATG | before abstractions/ optimizations | 62 | 42 |
| | after abstractions/ optimizations | 75 | 51 |

Technical Advantages

The technical advancements of the present invention include:

The present invention proposes a method to generate test data for masking MCDC using program code.

The present invention proposes a method to achieve reduction in time and effort required for the preparation of test data for MC/DC analysis.

This present invention proposes a method to generate more reliable test data for MC/DC analysis as compared to manual generation of test data for MC/DC analysis.

The present invention proposes a method to create a checker that reports whether the given program code and the test data present in the program code have achieved masking MC/DC analysis.

The present invention proposes a method to generate test data for MCDC such that it is not limited to the level of testing (such as, unit level, module level or sub-system level).

The present invention proposes a method to ensure that the model checkers being used scale up for a larger size of program code.

While considerable emphasis has been placed herein on the components and component parts of the preferred embodiments, it will be appreciated that many embodiments can be made and that many changes can be made in the preferred embodiments without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

What is claimed is:

1. A computer implemented system for automatic generation of test data for testing of a program code satisfying the Modified Condition/Decision Coverage MC/DC metric, said system comprising:
    a code-optimizer configured to optimize and abstract the program code using techniques selected from a group consisting of constant folding, loop unrolling and delay abstraction;
    an annotating module configured to annotate said optimized program code, wherein said annotating module comprises an insertion module configured to insert at least two assert statements at a pre-determined location in said optimized program code and create an annotated set of programs;
    a database storing said annotated set of programs;
    a processor co-operating with the database, wherein said processor comprises:
        a. a program-selector which selects a program from said annotated set of programs;
        b. a model-checker which checks for violation of the assert statements inserted in the optimized program; and generates a trace for each of the annotated programs in the set;
        c. a test-data-generator which generates test data for each of the annotated programs in the set; and
    an MC/DC checking module which receives and tests the program code with said generated test data; identifying a condition of the program code not covered by the test cases using the MC/DC checker; and further provides a feedback on MC/DC metric compliance, in case of non-compliance the process is iterated for a new set of traces/counterexamples.

2. The system as claimed in claim 1, wherein said test-data-generator further includes a testing module for testing of the programs in said annotated set of programs at function level, module-level and at sub-system levels.

3. The system as claimed in claim 1, wherein said annotating module inserts annotations at a pre-determined location selected from a group of locations consisting of a pre-decision location, a post-decision location and an assignment location in the program code.

4. The system as claimed in claim 1, wherein said processor further comprises an alert-generator to generate alerts in the event that any violation is generated during the generation of the traces of the programs.

5. The system as claimed in claim 1, wherein said test data generator generates test data using a counter-example based approach.

6. A computer-implemented method for automatic generation of test data for testing of a program code satisfying the Modified Condition/Decision Coverage MC/DC metric, said method comprising the steps of:
    performing abstraction and optimization on the program code, and producing an optimized program code using techniques selected from a group consisting of constant folding, loop unrolling and delay abstraction;
    annotating said optimized program code by inserting at least two assert statements at a pre-determined location and further generating an annotated set of programs;
    storing the annotated set of programs in a database;
    selecting the programs from said annotated set of programs;
    checking for violation of the assert statements inserted in the said optimization program code, and generating a trace for each program in the set; wherein said checking for violation and said generating a trace are performed by using a model checker;
    generating at least one test data for each program in the set;
    testing the program code using an MC/DC checker;
    identifying a condition of the program code not covered by the test cases using the MC/DC checker; and
    providing a feedback on the MC/DC metric compliance, in case of non-compliance the process is iterated for a new set of traces/counter-examples.

7. The method as claimed in claim 6, wherein the step of generating at least one test data includes the step of using a counter-example based approach for generating at least one test data.

8. The method as claimed in claim 6, wherein the step of testing the program in said annotated set of programs includes the step of checking whether the program code provided as an input source code has achieved masking MC/DC for decisions using said generated test data.

* * * * *